(12) United States Patent
Hoel et al.

(10) Patent No.: US 7,037,542 B2
(45) Date of Patent: May 2, 2006

(54) PROCESS OF RAPIDLY PREPARING A FERMENTED DRY OR SEMI-DRY SAUSAGE PRODUCT AND PRODUCTS THEREFROM

(75) Inventors: Vicky Hoel, Blaine, MN (US); Kyle A. Newkirk, St. Michael, MN (US)

(73) Assignee: General Mills, Inc., Minneapolis, MN (US)

( * ) Notice: Subject to any disclaimer, the term of this patent is extended or adjusted under 35 U.S.C. 154(b) by 230 days.

(21) Appl. No.: 10/376,178

(22) Filed: Feb. 27, 2003

(65) Prior Publication Data

US 2004/0170723 A1    Sep. 2, 2004

(51) Int. Cl.
*A23L 1/317* (2006.01)
*A23B 4/22* (2006.01)

(52) U.S. Cl. .................... 426/59; 426/105
(58) Field of Classification Search ........... 426/59, 426/56, 61, 129, 646, 105, 513
See application file for complete search history.

(56) References Cited

U.S. PATENT DOCUMENTS

| 4,514,424 A | 4/1985 | Raccach |
| 4,803,092 A | 2/1989 | Weiss et al. |
| 4,847,097 A | 7/1989 | Boudreaux et al. |
| 5,639,495 A * | 6/1997 | Alden et al. .................. 426/59 |
| 5,736,186 A | 4/1998 | Holdren et al. |

FOREIGN PATENT DOCUMENTS

EP    0572305 B1    1/1997

OTHER PUBLICATIONS

Nuckles et al., 1987, Journal of Food Science (1987) 52 (1): 238-239—*Reduction in pH and Fermentation Time of Meat Mixtures Containing Dry Acid Whey*, 238-239.
Maijala et al., 1993, Journal of Food Protection (1993).56 (2): 125-129—*The Effect of GDL-Induced pH Decrease on the Formation of Biogenic Amines in Meat*, 125-129.
Juttelstad, 1999, Food Product Design: Design Elements (1999)—*The Best of the Wurst*, All.

* cited by examiner

*Primary Examiner*—Keith Hendricks
(74) *Attorney, Agent, or Firm*—Arlene L. Hornilla; Douglas J. Taylor

(57) ABSTRACT

The present invention provides a process for rapidly producing dry and/or semi-dry sausage products through the use of a single extrusion step that is capable of both drying and cooking the sausage product. The present invention is capable of production of non-conventionally shaped sausage products for use as food and pizza toppings, snacks and ready to eat meal pieces.

17 Claims, 2 Drawing Sheets

PROCESS OF RAPIDLY PREPARING A FERMENTED DRY OR SEMI-DRY SAUSAGE PRODUCT AND PRODUCTS THEREFROM

CROSS-REFERENCES TO RELATED APPLICATIONS

None.

FIELD OF THE INVENTION

The field of the present invention relates to a process of accelerating meat product fermentation. More particularly, it has been found that through the utilization of a combination of slow release acidulants and bacterial cultures that dry or semi-dry sausage products may be obtained in a more expeditious manner when compared with conventionally prepared sausage products without the loss of desirable textural properties.

BACKGROUND OF THE INVENTION

Ingredient costs are typically one of the highest economical components encountered when producing products intended for human or animal consumption. Processes such as aging, drying, curing, etc. slow the availability of such ingredients to the manufacturer as well as increase the overall costs due to the added inventory carrying time and treatment steps that are necessary to produce such a product.

A typical dry or semi-dry sausage fermentation process generally requires a long period of time, typically on the order of at least about 10 to 24 hours. This duration of time is necessary, in that by holding the sausage product for a sufficient amount of tmie allows the bacterial culture to metabolize the sugars that are present in the sausage meat admixture. This slow fermentation process has been used because the process preserves the textural properties of the meat product and limits the amount of protein denaturation that occurs, while providing a fermented product flavor to the dry and semi-dry sausages such as pepperoni and the like.

The acidulation of meat products, particularly meat emulsions, is well known. Meat emulsions, such as sausage emulsions, are mixtures of lean meat or meat protein and water that form a matrix in which fat particles, salt, sugar and curing agents are dispersed.

Acidulation of meat products in the past has been accomplished by various means. One such method comprises inoculating the meat mass with a small amount of previously fermented food. The resulting inoculated food mass is then allowed to ferment for an extended period of time. However, fermentation using this method is very slow because of the time required for bacteria to grow and produce acids (usually lactic acid) which eventually lower the food pH to the desired level required for dry and semi-dry sausage products.

Another method of acidulating food includes the addition of acid directly to the food product that is being prepared. This process, which quickly facilitates the reduction of the pH of the meat mixture has negative implications on the resulting flavor and texture of the resulting meat product and may destroy valuable textural properties if the process is not constantly monitored.

Dry and semi-dry sausage products are classified by the United States Department of Agriculture ("USDA") according to process conditions, finished product pH, finished product moisture to protein ratio and other factors. For example, in order to meet the criteria for pepperoni, the product must have a finished product moisture to protein ratio of 1.6 to 1 and be processed under conditions specified by the USDA sufficient to kill trichinae. In order to meet the criteria for beef summer sausage, the product must have a finished product moisture to protein ratio of 3.1 to 1 and a finished product pH of no greater than 5.0.

A conventional process for making dry and semi-dry sausage products typically includes the following steps: Initially, adding and mixing (admixing) ground meat (pork, beef and/or poultry) with spices, curing agents and either an acid-producing bacteria, e.g., lactic acid-producing bacteria or an acidulant. The types of meat, spices and curing agents employed depend upon the type of sausage product desired.

Next, the meat mixture is formed into the desired shape by stuffing the mixture into casings of prepared animal intestine or synthetic material which are tied shut at both ends to form a single cylindrical unit or at intervals to form lengths. The mixture must be pre-formed into the tubular shape before the bacteria produces a significant amount of acid, or as is otherwise imparted to the admixture. The bacterial culture or acidulant quickly lowers the pH of the admixture making the meat non-pliable and difficult to shape.

The formed products are allowed to set in a fermenting chamber at a pre-determined temperature and for a period of time sufficient for enough acid to be produced by the bacteria or released by the acidulant to lower the pH of the admixture to a value below 5.2, typically below 5.0. The bacteria cause fermentation of carbohydrates to produce the lactic acid, which gives the sausage its characteristic flavor. The lactic acid also serves to lower the pH of the meat proteins toward their isoelectric point. This is particularly desirable because the meat proteins are less able to bind moisture as they approach their isoelectric point, thereby facilitating subsequent drying of the sausage.

The low pH level prevents further bacterial growth and otherwise makes the product biologically stable, produces an acidic flavor and sets the protein in the meat thereby giving the product a firm texture. The temperature in the fermentation chamber is typically maintained between 60° F. and 105° F. for about 7 to 14 hours.

Finally, the product is dried at a predetermined temperature and for a period of time sufficient to obtain the required finished product moisture to protein ratio (e.g., for pepperoni, 1.6:1). For dry sausage products, the drying step must be carried out under conditions which allow slow controlled uniform removal of moisture from the product yet inhibit the growth of surface mold or yeast. For example, the drying chamber is typically maintained at a temperature between 50° F. and 70° F. and kept relatively dry to inhibit the growth of mold or yeast. It generally requires several days or even weeks to reach the required finished product moisture to protein ratio depending upon the thickness of the formed product and other process conditions.

Some dry sausage is smoked prior to being dried but the primary production step is a relatively long, continuous air-drying process. Dry sausage typically requires more production time than other types of sausage. Dry sausage generally ranges from about 60% to about 80% of its original weight when sold. Semi-dry sausage is usually heated in a smokehouse to fully cook and partially dry the product.

Unfortunately, maintenance of the required conditions during the extended fermenting and drying steps can make mass production of dry and semi-dry sausage products somewhat difficult. There is a need for an economical process for making dry and semi-dry sausage products in a shorter period of time.

Surprisingly, what the inventors have found is that the invention allows one to achieve a fermentation process whereby in less than 5 hours and preferably less than 3 hours the meat admixture is at the desired pH of a fermented product without adversely affecting the textural and flavor properties even when using acidulants in the initial stages of the process.

BRIEF SUMMARY OF THE INVENTION

This invention is directed to a process of rapidly preparing a fermented dry or semi-dry sausage product.

The invention is also directed to meat products obtained by this rapid fermentation process.

It is a primary object of this invention to provide a significantly reduced processing time for the likes of a traditional pepperoni from several days to less than five hours and ideally, less than about 3 hours. The reduced time frame significantly decreases the processing costs and enables increased throughput of the sausage product.

To accomplish these and other related objects of the invention, in one exemplary aspect, the present invention provides a process for rapidly preparing a fermented dry or semi-dry sausage product that includes the steps of initially admixing an amount of ground meat, containing a source of at least one fermentable carbohydrate, with an amount of an edible acidulant to lower the pH of the ground meat to a level below its buffering ability. Next, an amount of a bacterial culture is added to enable the fermentation of the ground meat. Then the meat admixture is formed into a desired shape; and finally, the formed meat admixture is fermented to achieve the desired dry sausage or semi-dry sausage product. The amount of the acidulant is selected so as to minimize denaturation of proteins in the ground meat admixture thereby retaining the textural quality of the fermented dry sausage or semi-dry sausage product.

Preferably, the time for preparing the fermented dry sausage or semi-dry sausage product is less than 5 hours and more desirably less than about 3 hours.

The process may preferably further comprise the step of admixing one or more spices and/or one or more seasonings into the ground meat, dried pepperoni acidulant admixture, wherein the spices are selected from red pepper, black pepper, white pepper, anise, fennel, and others and the seasonings are selected from liquid oleoresins of spices, ground mustard, salt, garlic, onion and others.

Preferably, the dried sausage product is pepperoni. It is also preferred that the process further includes the step of packaging the resulting sausage product as required for shipping or storage.

In another aspect, the invention is related to a semi-dry or dry sausage product prepared in accordance with the method described above.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
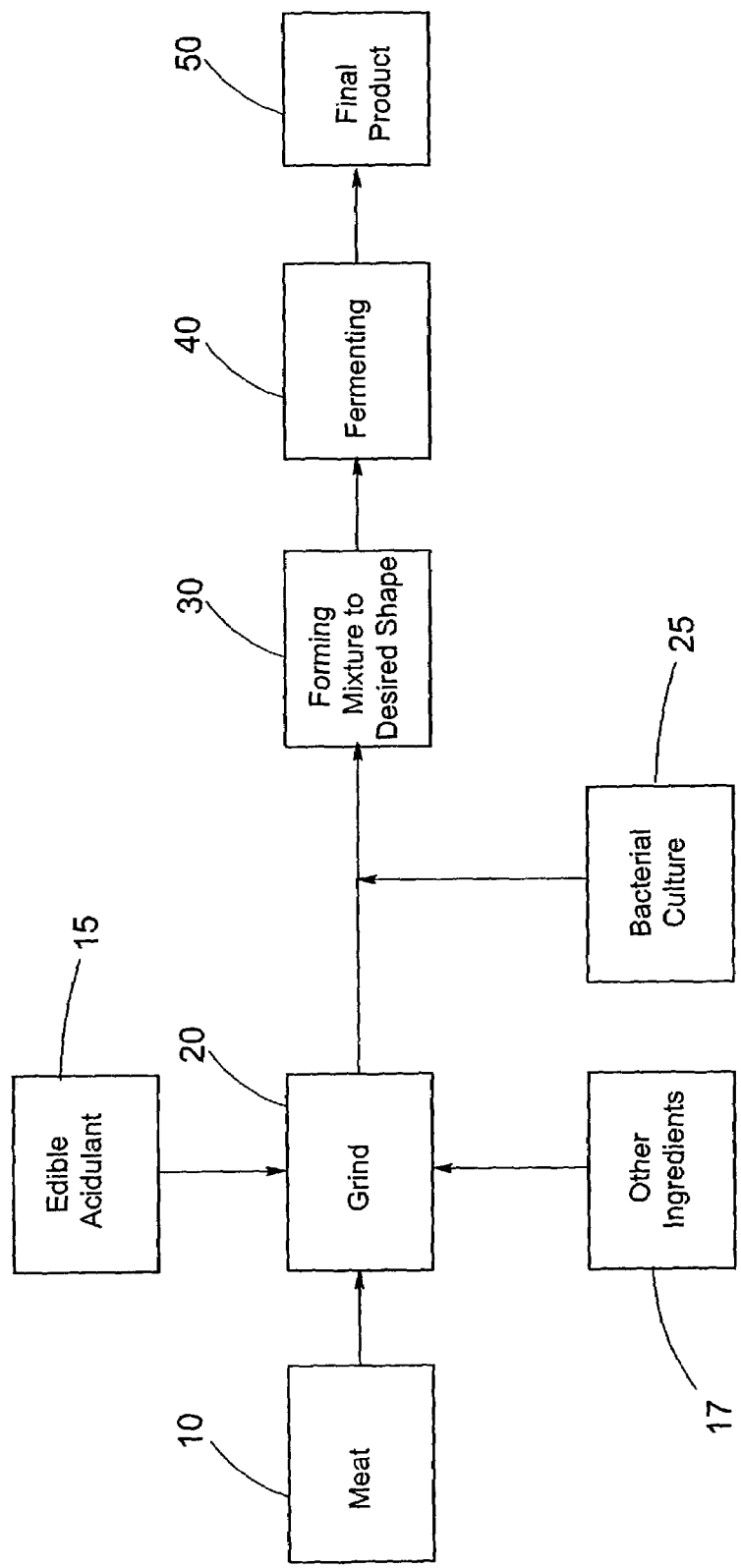
FIG. 1 depicts a flow diagram of certain exemplary process steps involved in the present invention.

The present invention is now illustrated in greater detail by way of the following detailed description, but it should be understood that the present invention is not to be construed as being limited thereto.

The invention utilizes a combination of one or more acidulants including but not limited to glucano-delta-lactone or encapsulated acids such as lactic, malic, citric, sorbic and the like, in conjunction with a bacterial culture typically used in the production of dry and/or semi-dry sausage products to lower the pH of the sausage and impart microbiological stability, textural qualities, microbiological properties and flavor.

The process allows for manufacturers to decrease the fermentation time to less than 5 hours and more preferably less than about 3 hours by altering the pH of the system slightly by using an acidulant that changes the initial pH of the meat admixture from around 6.2 to a pH of around 5.8 and preferably lower to around 5.3 where the sausage product still retains sufficient plasticity so as to be able to extrude and form the product into the desired shape. This pH range is more conducive to faster fermentation by the bacterial culture.

In addition to being able to process the dry or semi-dry sausage product in an expedited manner, it has been discovered that shapes other than conventional shapes may be formed from the sausage product. For example, the sausage product may be provided in geometric patterns such as stars, squares, pentagonals, hexagonals, and the like as well characters such as might appear in electronic games or in advertising or animate objects. As such, not only can the sausage producer provide ingredients to the food product manufacturer at a faster rate, the food product manufacturer can also use such products in connection with various marketing themes, advertising promotions and combinations thereof.

This inventive process also allows for a slower production of acid in the product when compared with the conventional processes involving the addition of powdered or aqueous acidulants. This beneficial processing step aids in preserving the textural properties of the product by limiting the amount of protein denaturation, while also giving the sausage product a more typical or customary fermented flavor that a consumer would expect to be associated with dry and semi dry sausages. Traditionally, products manufactured only with powdered or aqueous acids and/or encapsulated acids do not possess the same flavor characteristics as fermented meat products.

In the exemplary embodiment described herein, the ground meat is preferably selected from pork, beef and poultry, (chicken, turkey, etc.), or mixtures thereof. Other combinations or additions are of course possible, including alligator, bison, bear, elk, deer, ostrich, game birds and other fowl, etc.

The fermentable carbohydrate is preferably selected from dextrose, sucrose, fructose, lactose, maltose and other sugars suitable for inclusion in food products and combinations thereof, with dextrose being preferred.

The edible acidulant is selected from glucano-δ-lactone, lactic, malic, citric, acetic, isoascorbic, adipic, tartaric, sorbic acid and mixtures thereof. It is also preferred that the amount of ground meat to the amount of acidulant ratio is between 0.1 to 1.5:99.9 to 98.5 percent by weight, more preferably the amount of ground meat to the amount of acidulant ratio is between 0.5 to 1:99.5 to 99 percent by weight.

The bacterial culture releases lactic acid upon metabolism of the sugars within the meat admixture. In the exemplary embodiment, the bacterial culture is selected from *Lactobacillus plantarum, Lactobacillus Bavarious, Lactobacillus Curvatus* and *Lactobacillus Sake*.

Without being bound to any particular reasoning as to why the use of the combination of acidulant and bacterial culture in this manner produces such surprising results it is thought to be because of the following reasons.

Meat mixtures have significant buffering capacity that aid in negating the effects of adding acid prior to actually seeing a decrease in the pH of the mixture. The use of an acid to take the mixture "through" the buffering capacity of the meat is therefore useful in speeding up the process of the invention. However, the acidulant is not used during the whole process because of the historical problems of fast acidulation, namely the negative effect seen on the texture of the meat product arising because of the rapid denaturation of the meat protein. This rapid denaturation prevents the proteins from binding to each other to achieve the desired textural matrix that one normally associates with conventionally fermented meat products.

In the present invention, by utilizing a combination of slow release acidulant and a bacterial culture it is possible to mitigate and even eliminate what is effectively an activation barrier arising from the buffering capacity of the meat without affecting too dramatically the pH of the meat admixture. In addition, the slower acidification arises from the presence of the bacteria in the culture. That is the bacteria produces additional acid. In light of this situation, the slower acidification then moves faster than one would normally otherwise observe as the bacteria in the culture tends to produce more lactic acid at a quicker rate which correspondingly accelerates the rate of growth of the bacteria when compared with the normal fermentation scenario. This results in the finished product reaching the desired pH much more quickly than in a typical fermentation process. The addition of the acidulant does not adversely affect the textural, flavor and microbiological qualities of the meat mixture.

Turning now to FIG. 1, an exemplary flow chart of the present process is illustrated and includes the meat being initially provided at step 10. The meat is then placed at a grinder 20, which may be any conventional grinder, meat blender or the like. Next, an edible acidulant at 15 and possibly other ingredients 17, seasonings, etc. as described herein are added to the meat. The combined mixture is further ground and prior to passing the meat mixture to the forming stage, a bacterial culture is added at 25. The culture in combination with the acidulant begins the fermentation process, that is the bacteria begins to produce acid in addition to the beneficial addition of the acidulant. Next, the mixture is passed to a forming and shaping step designated at 30 in which the meat is extruded to form the desired shape. The shaped sausage is allowed to ferment for a period of time at step 40 to produce a product that may undergo some additional treatment steps at 50, such as heating, drying and/or cooking prior to being packaged.

Figure 2:
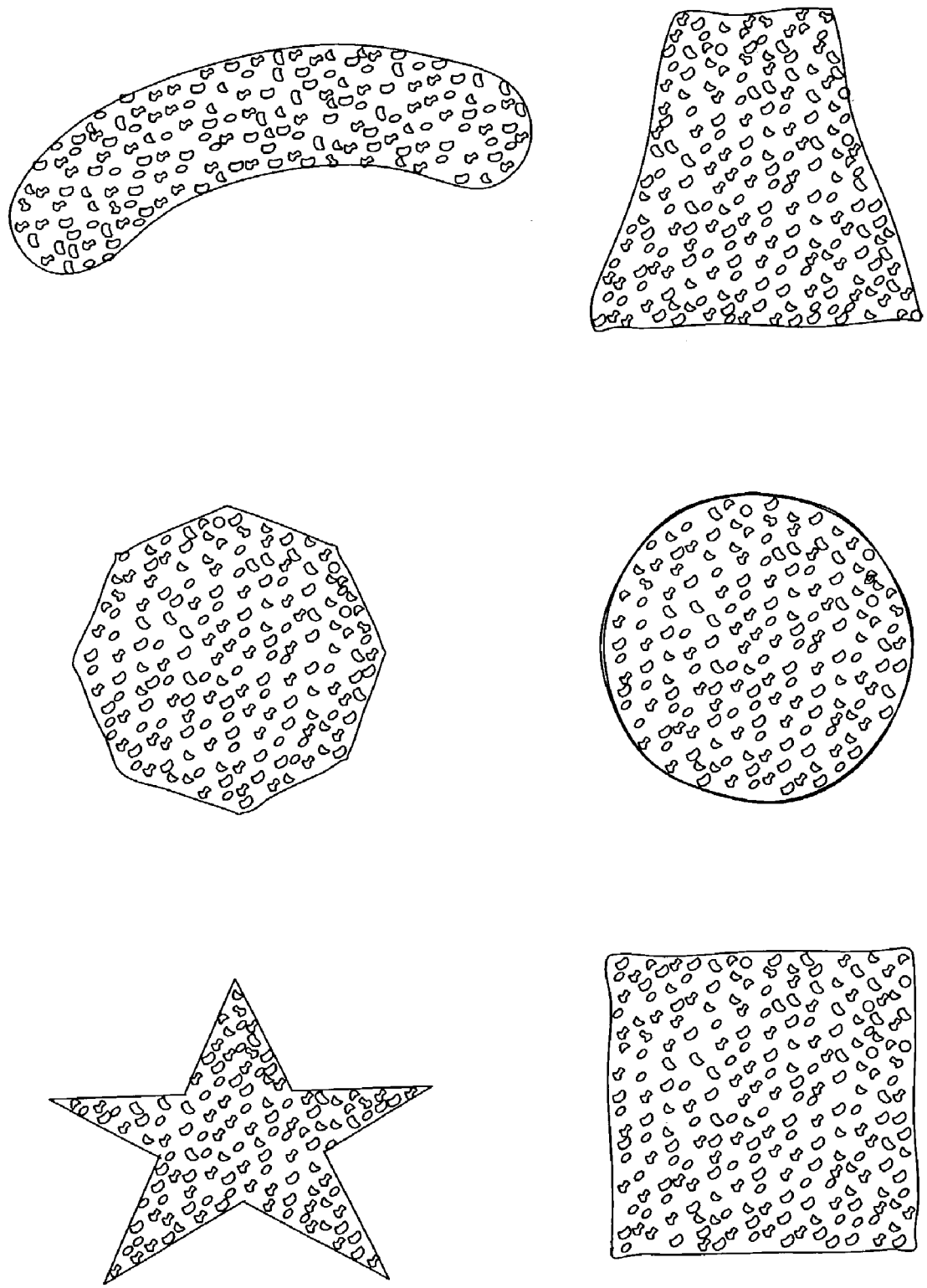
FIG. 2 depicts a variety of shapes in which the product produced by the current process may be provided.

Turning briefly to FIG. 2, the illustration depicts a number of configurations and shapes that may be produced in connection with the present embodiment. Other configurations, shapes, designs, etc. are of course possible.

In order to further illustrate the inventive process, the following example is given. Although the example is presented to illustrate certain specific embodiments of the invention, it is not to be construed to restrict the scope and spirit of the invention.

EXAMPLE 1

A sample of dry sausage (pepperoni) was produced in accordance with the inventive process.

First, the meat, approximately 5 kg, was ground and then admixed with the slow release acidulant, glucanodeltalactone (GDL) approximately 0.5% by weight of the ground meat. Dextrose is added to the meat mixture. Additional spices, seasonings, a curing agent and a protein source may be added to form a sausage admixture. The meat consisted of a mix of beef and pork in a range of approximately 30% beef and 70% pork. The beef and pork were ground together in a conventional meat grinder prior to being admixed with the other ingredients. The total fat content in the meat was about 35% by weight based on the weight of the meat (meat referring to the meat mix).

The spices and seasonings used were conventional sausage or Italian seasonings obtained from Chris Hanson Corp. and included approximately 5% by weight of the batch prepared.

Next, a bacterial culture selected from the group of *Lactobacillus plantarum, Lactobacillus Bavarious, Lactobacillus Curvatus* and *Lactobacillus Sake* was added.

The ground meat mix was admixed with the acidulant, spices, seasonings, curing agent in a conventional meat blender for approximately 4 minutes.

The sausage admixture is then formed to a desired shape and is continuously extruded into a plurality of rectangular strips, each strip being approximately 4 inches wide and ⅜ of an inch high. The strips were extruded by loading the sausage admixture into an extrusion chamber and using a piston to push the admixture through an extrusion head.

The shaped sausage was then allowed to ferment at a temperature of 110° F. for about 90 to 120 minutes until the pH of the meat dropped below 5.0.

The shaped sausage product may be put through a heating device, which cooks and dries the shaped sausage pieces. An exemplary device for this purpose is a conventional batch oven that operates at a temperature of approximately 120° F. to 150° F. and the time required for drying was approximately 30 minutes.

A few of the pieces were analyzed upon exiting the oven. The pieces looked and tasted like conventional pepperoni, had a pH level of around 4.3 and a moisture to protein ratio of 1.6:1 or less.

The required finished product moisture to product ratio for various types of dry and semi-dry sausage products is shown below.

| Product | Moisture to Protein Ratio |
| --- | --- |
| Beef summer sausage | 3.1:1 |
| Pepperoni | 1.6:1 |

-continued

| Product | Moisture to Protein Ratio |
| --- | --- |
| Jerky | 0.75:1 |
| Dry sausage | 1.9:1 |
| Thuringer | 3.7:1 |
| Dry salami | 1.9:1 |
| Genoa salami | 2.3:1 |
| Farmer summer sausage | 1.9:1 |

The drying step can be carried out using many different types of heating devices, including but not limited to linear forced air dryers/oven, vacuum dryers, spiral forced air dryers, batch ovens and the like.

Once the drying step is completed, any dried off cuts resulting from the slicing, dicing or cutting step can be separated and removed from the desired products. The off cuts can then be fed back into the process as a protein source that can be ground up with the next batch of meat destined for processing in a further cycle of the process.

The remaining dried and suitably shaped products can then be packaged, chilled, optionally frozen and shipped/stored as required.

The dry or semi-dry sausage product produced in accordance with the above-mentioned process may be produced in a number of configurations, including conventional shapes. However, the process envisions that the product may be provided in unique shapes or themes to supplement a particular marketing promotion. For example, the pieces may be provided in geometric patterns such as stars, squares, pentagonals, hexagonals, and the like as well characters such as might appear in electronic games or in advertising or animate objects.

It will thus be seen according to the present invention a highly advantageous process for producing dry and semi-dry sausage has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The invention claimed is:

1. A process for rapidly preparing a fermented dry sausage or semidry sausage product in a period of time less than five hours, comprising the steps of
   i) admixing an amount of ground meat, containing a source of at least one fermentable carbohydrate, with an amount of an edible acidulant to lower the pH of the ground meat below its buffering ability,
   ii) adding an amount of a bacterial culture to enable the fermentation of the ground meat;
   iii) forming the meat admixture into a desired shape;
   iv) fermenting the formed sausage admixture to achieve the desired dry sausage or semi-dry sausage product; and
   v) heat-treating the meat admixture during the fermentation step at a temperature of between about 120° F. to about 150° F.;
   wherein the amount of the acidulant is selected so as to minimize denaturation of proteins in the ground meat admixture thereby retaining the textural quality of the fermented dry sausage or semi-dry sausage product; and
   wherein the steps of admixing, adding, forming, fermenting and heat-treating are performed in under 5 hours to produce the fermented dry sausage or semi-dry sausage product.

2. The process according to claim 1, wherein the edible acidulant is selected from glucano-o-lactone, lactic, malic, citric, acetic, isoascorbic, adipic, tartaric, sorbic acid and mixtures thereof.

3. The process according to claim 1, wherein production of the dry or semi-dry sausage is done in a period of time of about three hours.

4. The process according to claim 1, wherein the amount of ground meat to the amount of acidulant ratio is between 99.9 to 98.5:0.1 to 1.5 percent by weight.

5. The process according to claim 1, wherein the amount of ground meat to the amount of acidulant ratio is between 99.5 to 99:0.5 to 1% by weight.

6. The process according to claim 1, wherein the amount of acidulant is selected to change the pH of the meat admixture from around a pH of 6.2 to a pH of from around 5.8.

7. The process according to claim 1, wherein the at least one I fermentable carbohydrate source is selected from a group consisting of dextrose, sucrose, fructose, lactose, maltose and combinations thereof.

8. The process according to claim 7, wherein the at least one fermentable carbohydrate source is dextrose.

9. The process according to claim 1, wherein the bacterial culture is selected to release lactic acid upon metabolism of the fermentable carbohydrate source within the meat admixture.

10. The process according to claim 9, wherein the bacterial culture I is selected from a group consisting of *Lactobacillus plantarum, Lactobacillus bavarious, Lactobacillus curvatus* and *Lactobacillus sake* and combinations thereof.

11. The process according to claim 1, further comprising drying the meat admixture to obtain a desired moisture to protein ratio.

12. The process according to claim 11, wherein the desired moisture to protein ratio is between 1.6:1.0 by weight.

13. The process according to claim 1, further comprising a step of packaging the dry or semi-dry product.

14. The process according to claim 1, further comprising a step of admixing one or more spices and/or one or more seasonings into the ground meat, acidulant admixture.

15. The process according to claim 14, wherein the spices are selected from a group consisting of red pepper, black pepper, white pepper, anise, fennel, and combinations thereof, and the seasonings are selected from a group consisting of liquid oleoresins of spices, ground mustard, salt, garlic, onion and combinations thereof.

16. The process according to claim 1, wherein the semi-dry or dry sausage product is selected from a group consisting of beef summer sausage, thuringer, sicilian salami, pepperoni, dry salami and genoa.

17. The process according to claim 16, wherein the dry sausage product is pepperoni.

* * * * *